US011479209B2

(12) United States Patent
Hiruta et al.

(10) Patent No.: US 11,479,209 B2
(45) Date of Patent: Oct. 25, 2022

(54) INPUT INFORMATION MANAGEMENT SYSTEM

(71) Applicant: HONDA MOTOR CO., LTD., Tokyo (JP)

(72) Inventors: Shigenori Hiruta, Wako (JP); Yuji Nishikawa, Wako (JP); Takuya Hamaguchi, Wako (JP); Hiroyuki Hayashi, Kawasaki (JP)

(73) Assignee: HONDA MOTOR CO., LTD., Tokyo (JP)

(*) Notice: Subject to any disclaimer, the term of this patent is extended or adjusted under 35 U.S.C. 154(b) by 327 days.

(21) Appl. No.: 16/816,673

(22) Filed: Mar. 12, 2020

(65) Prior Publication Data
US 2020/0307516 A1    Oct. 1, 2020

(30) Foreign Application Priority Data
Mar. 26, 2019 (JP) ............................. JP2019-057597

(51) Int. Cl.
*B60R 25/24* (2013.01)
*H04L 9/32* (2006.01)
*H04L 9/08* (2006.01)

(52) U.S. Cl.
CPC .......... *B60R 25/241* (2013.01); *H04L 9/0819* (2013.01); *H04L 9/3234* (2013.01); *H04L 9/3263* (2013.01)

(58) Field of Classification Search
None
See application file for complete search history.

(56) References Cited

U.S. PATENT DOCUMENTS 6,310,542 B1* 10/2001 Gehlot ................. B60R 25/252
340/426.25
7,613,551 B2* 11/2009 Watanabe ........... B60R 25/2036
307/10.6
(Continued)

FOREIGN PATENT DOCUMENTS

JP    2006-178643       7/2006
JP    2012-203428 A    10/2012
(Continued)

OTHER PUBLICATIONS

Japanese Office Action with English translation dated Feb. 16, 2021, 7 pages.

*Primary Examiner* — Brandon Hoffman
(74) *Attorney, Agent, or Firm* — Rankin, Hill & Clark LLP

(57) ABSTRACT

An input information management system for a vehicle that can be used by using each of a plurality of electronic keys, the system managing input information that is input by a user, where the system includes a key information acquisition unit that acquires and stores key information of an electronic key, when an operation is performed on the vehicle using the electronic key, and an input information erasure unit that erases the input information that is stored in a storage device, where, when the key information is acquired by the key information acquisition unit, the input information erasure unit compares current key information that is acquired with last key information that is last stored by the key information acquisition unit before acquisition of the current key information, and erases the input information that is stored in the storage device on a basis of a result of the comparison.

7 Claims, 4 Drawing Sheets

(56) References Cited

U.S. PATENT DOCUMENTS

| | | | |
|---|---|---|---|
| 8,634,822 B2* | 1/2014 | Silver | H04W 4/46 340/439 |
| 2016/0173568 A1* | 6/2016 | Penilla | G07F 15/005 709/217 |
| 2018/0354460 A1* | 12/2018 | Bartels | G07C 9/00182 |

FOREIGN PATENT DOCUMENTS

| | | |
|---|---|---|
| JP | 2013-044708 A | 3/2013 |
| JP | 2016-203744 A | 12/2016 |

* cited by examiner

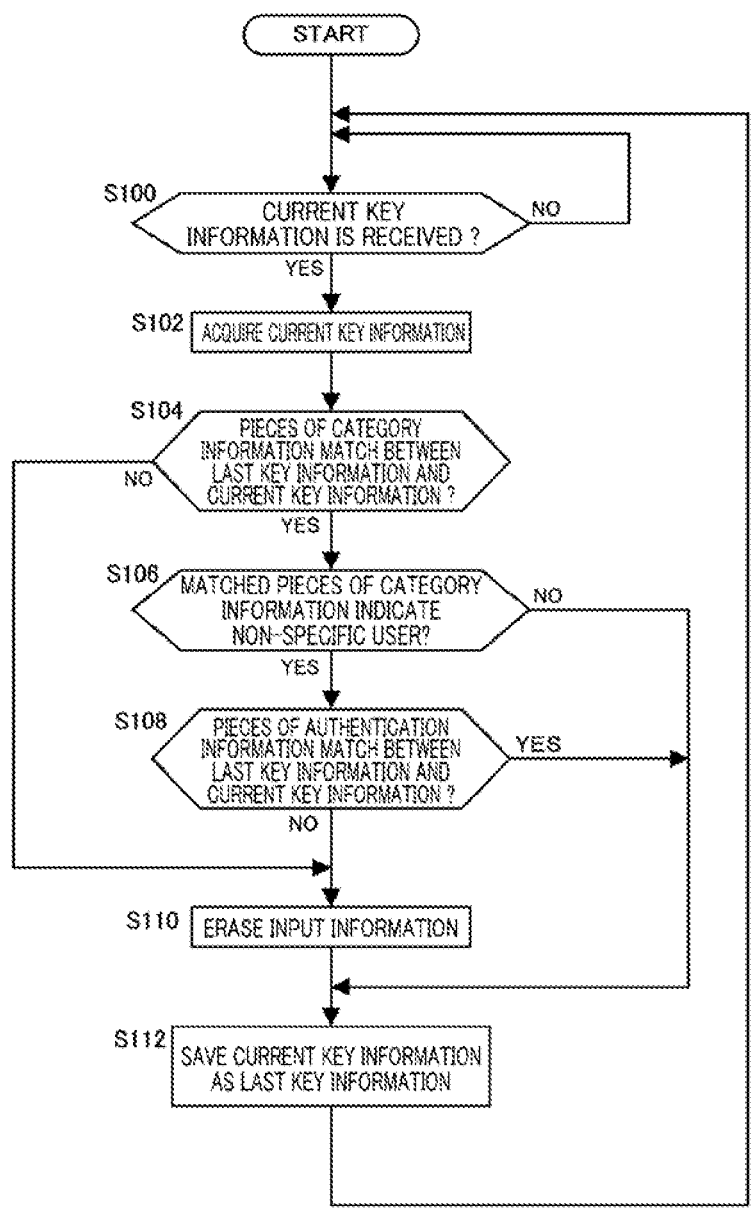

INPUT INFORMATION MANAGEMENT SYSTEM

INCORPORATION BY REFERENCE

The present application claims priority under 35 U.S.C. § 119 to Japanese Patent Application No. 2019-057597 filed on Mar. 26, 2019. The content of the applications is incorporated herein by reference in its entirety.

BACKGROUND OF THE INVENTION

Field of the Invention

The present invention relates to an input information management system for a vehicle that can be used by a plurality of users using a plurality of respective electronic keys, the input information management system managing information that is input in an in-vehicle device by a user.

Description of the Related Art

In the case where a vehicle is used by a plurality of users, a device (in-vehicle device) that is installed in the vehicle is also possibly used by the users. Such an in-vehicle device includes an application execution device, such as a so-called display audio, a connectivity audio or the like, that provides users with various functions by executing application programs (hereinafter also simply referred to as "application(s)").

An application to be executed by such an application execution device may, at the time of execution, require a user to input account information (or login information), such as an ID (identification code) or a password of the user, to perform a login operation, for example. Furthermore, an application to be executed by the application execution device may require similar account information or login information at the time of accessing a website or the like through the application, or may require input of personal information of the user, such as an address or a date of birth, to set the account information or the like.

Depending on the application, when a user inputs the account information or the personal information through an input device, such as a touch panel, provided in the application execution device, for example, the account information or the personal information that is input may be stored in a storage device provided in the application execution device, in the manner of a cookie in a web browser, for example. Such input information that is stored in the storage device may be automatically referred to when another user activates a similar application, for example, and a login operation is possibly performed using the account information or the login information of the previous user. As a result, with a vehicle that can be used by a plurality of users using a plurality of respective electronic keys, there may arise problems such as plagiarism or erroneous use, by one user, of the account information, the personal information or the like input to the in-vehicle application execution device by another user, or leakage of such information to outside.

Conventionally, there is known a navigation device that stores and uses personal settings of each user, with respect to each of a plurality of users (for example, see Japanese Patent Laid-Open No. 2006-178643). With this navigation device, each user possesses a key having a unique key code, and the key code is transmitted by the key to the navigation device at the time of using the navigation device. If the received key code is not stored in a storage device of the navigation device, the navigation device stores the received key code, and also, secures, in the storage device, an individual storage area associated with the key code, and saves contents that are set in the navigation device by the user in the individual storage area. On the other hand, if the key code received from the key is already stored in the storage device, the navigation device refers to the setting contents that are saved in the individual storage area associated with the key code, and provides the user with various functions using the settings.

However, the conventional navigation device as described above is merely for automatically switching the settings according to the user, and does not provide measures against plagiarism and the like of user input information at an in-vehicle application execution device as described above.

The present invention has been made in view of the circumstances described above, and an object of the present invention is to prevent plagiarism and the like of account information and the like possibly occurring among a plurality of users through an in-vehicle device in a vehicle that can be used by the users.

SUMMARY OF THE INVENTION

An aspect of the present invention is an input information management system for a vehicle that can be used by using each of a plurality of electronic keys, the system managing input information that is input by a user, the system including: a key information acquisition unit that acquires and stores key information of an electronic key, when an operation is performed on the vehicle using the electronic key; and an input information erasure unit that erases the input information that is stored in a storage device, wherein, when the key information is acquired by the key information acquisition unit, the input information erasure unit compares current key information that is acquired with last key information that is last stored by the key information acquisition unit before acquisition of the current key information, and erases the input information that is stored in the storage device on a basis of a result of the comparison.

According to another aspect of the present invention, the key information of the electronic key that is acquired by the key information acquisition unit includes category information indicating a category of a holder of the electronic key, and the input information erasure unit erases the input information that is stored in the storage device, when the category information in the current key information and the category information in the last key information do not match.

According to another aspect of the present invention, the category information is for distinguishing between at least an owner of the vehicle, a specific user who has a predetermined relationship with the owner, and a non-specific user who is neither the owner nor the specific user.

According to another aspect of the present invention, the key information of the electronic key that is acquired by the key information acquisition unit includes authentication information for identifying the electronic key, and in a case where the category information in the current key information and the category information in the last key information match, and matched pieces of the category information are predetermined category information, the input information erasure unit erases the input information that is stored in the storage device, if the authentication information in the current key information and the authentication information in the last key information are different from each other.

According to another aspect of the present invention, the predetermined category information indicates that the holder of the electronic key is the non-specific user.

According to another aspect of the present invention, a plurality of the electronic keys, each including the key information at least including the category information indicating the non-specific user, include respective pieces of authentication information in respective pieces of the key information, the pieces of authentication information being different from each other.

According to another aspect of the present invention, the input information includes at least one of personal information, an identification code, account information, a password, login information, or a correct answer for a security question of the user.

According to another aspect of the present invention, the storage device is provided in an application execution device for executing an application program, the input information is information that is input by the user to the application execution device at a time of execution of the application program, and the input information erasure unit issues an instruction to the application execution device to erase the input information that is stored in the storage device.

According to the aspect of the present invention, it is possible to prevent plagiarism and the like of account information and the like possibly occurring among a plurality of users through an in-vehicle device in a vehicle that can be used by the users.

BRIEF DESCRIPTION OF THE DRAWINGS

FIG. 4 is a flowchart showing an example procedure of an operation by the input information management system shown in FIG. 1.

DETAILED DESCRIPTION OF THE PREFERRED EMBODIMENT

Figure 1:
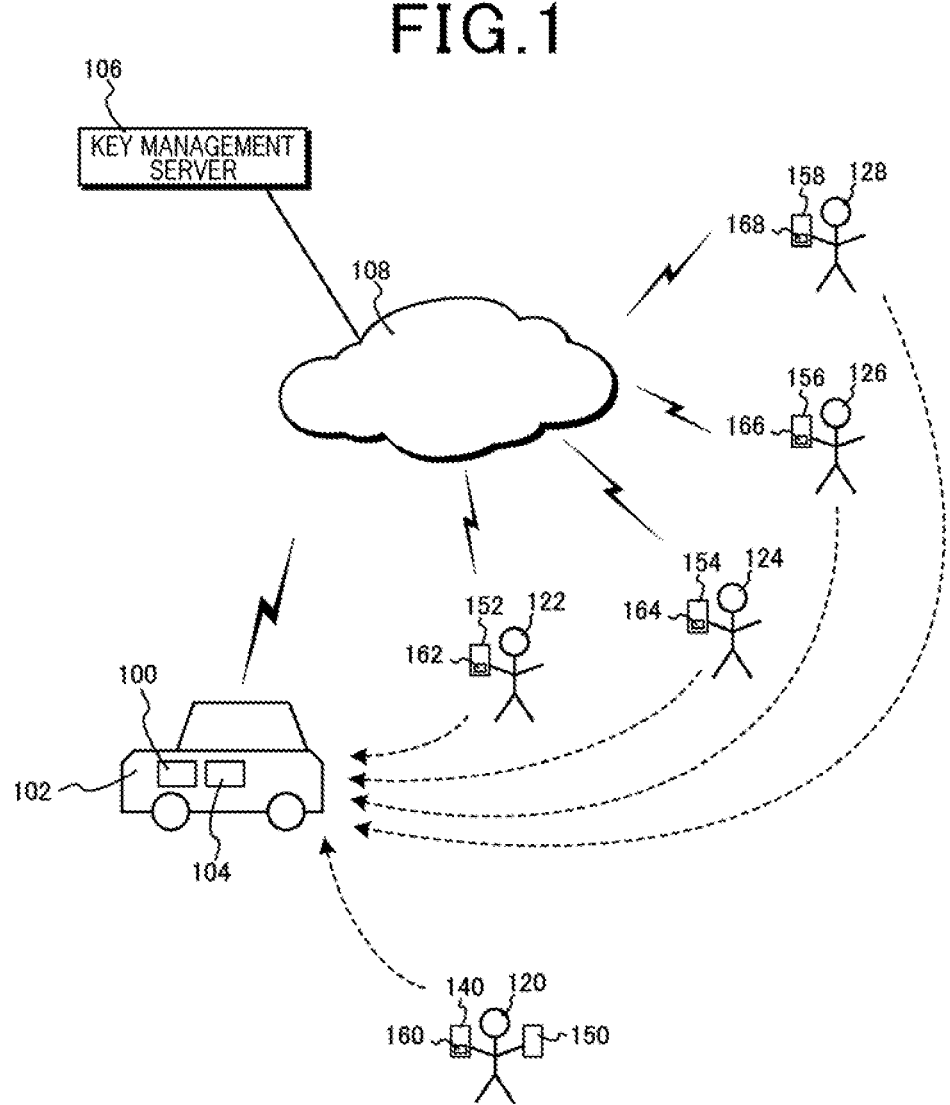
FIG. 1 is a diagram showing an example of a situation of use of an input information management system according to an embodiment of the present invention.

Hereinafter, an embodiment of the present invention will be described with reference to the drawings. FIG. 1 is a diagram showing an example of a situation of use of an input information management system according to an embodiment of the present invention. An input information management system 100 according to the present embodiment is installed in a vehicle 102, and is configured as one electronic control unit (ECU), for example. The vehicle 102 includes an application execution device 104 that provides a user with various functions by executing application programs. For example, the application execution device 104 is a display audio device (Display Audio) including an audio playback function, a function of accessing the Internet, and the like.

In the present embodiment, by depending on an application to be executed, at a time of execution of the application, such as at a time of a login operation by a user, the application execution device 104 requires the user to input account information (or login information) such as an ID (identification code) or a password of the user. Furthermore, by depending on an application to be executed, at a time of accessing a website or the like through the application, the application execution device 104 requires similar account information or login information, or requires input of personal information such as an address or a date of birth of the user for setting the account information or the like.

When a user inputs the account information or the personal information through an input device, such as a touch panel, provided in the application execution device 104, the application execution device 104 stores the account information or the personal information that is input in a storage device provided in the application execution device 104, by depending on an application such as a web browser that uses a cookie.

Then, when an electronic key is used on the vehicle 102, the input information management system 100 erases input information, such as the personal information, that is stored in the storage device or maintains the stored input information, depending on the electronic key that is used.

Here, in the present embodiment, users of the vehicle 102 are classified into an owner of the vehicle 102, a specific user, and a non-specific user. A specific user here refers to a person who has a predetermined relationship with the owner of the vehicle 102, and a non-specific user refers to a person other than the specific user. The predetermined relationship is, but not limited to, a family member, a relative, a joint purchaser of the vehicle 102, or the like. The predetermined relationship may be defined by the owner of the vehicle 102, for example, and belonging to a predetermined community, such as a same company or a club, may be taken as the predetermined relationship.

In FIG. 1, the vehicle 102 is used by a user 120, who is the owner of the vehicle 102, a user 122, who is a specific user and a family member of the owner, and users 124, 126 and 128, who are non-specific users who are third-party users (also referred to as "guest(s)") who use the vehicle 102 by borrowing the vehicle 102 from the user 120, who is the owner, for example.

The vehicle 102 is used by the user 120, who is the owner of the vehicle 102, using an electronic key 160 stored in an FOB key 140. Furthermore, the vehicle 102 is used by the user 122, who is a family member, and the users 124, 126 and 128, who are guests, using electronic keys 162, 164, 166 and 168, respectively, the electronic keys 162, 164, 166 and 168 being held in respective mobile terminals 152, 154, 156 and 158.

In the following, the users 122, 124, 126 and 128, other than the user 120, who is the owner of the vehicle 102, will be collectively referred to as the users 122 and so on, and the user 120 and the users 122 and so on will be collectively referred to as the users 120 and so on. Furthermore, the mobile terminals 152, 154, 156 and 158 possessed by the users 122 and so on, respectively, will be collectively referred to as the mobile terminals 152 and so on, and a mobile terminal 150 of the user 120 and the mobile terminals 152 and so on will be collectively referred to as the mobile terminals 150 and so on. Furthermore, the electronic keys 162, 164, 166 and 168 held by the mobile terminals 152 and so on, respectively, will be collectively referred to as the electronic keys 162 and so on, and the electronic key 160 held by the FOB key 140, and the electronic keys 162 and so on will be collectively referred to as the electronic keys 160 and so on.

A key management server 106 is communicably connected to the mobile terminals 150 and so on of the users 120 and so on through a network 108, for example. Under the approval of the user 120, who is the owner of the vehicle 102, the key management server 106 generates, for the users 122 and so on, other than the user 120, the electronic keys 162 and so on, each including category information indicating a class (category) indicating whether the corresponding one of the users 122 and so on is a specific user or a non-specific user, and transmits the electronic keys 162 and so on to the respective mobile terminals 152 and so on of the respective users 122 and so on. For example, the user 120 may transmit the approval using his/her mobile terminal 150, in response to an inquiry from the key management server 106. Additionally, whether the users 122 and so on, other than the user 120, who is the owner of the vehicle 102, are specific users or non-specific users may be indicated by the user 120, who is the owner, to the key management server 106 through the mobile terminal 150, or may be determined by the key management server 106 on the basis of information provided by the user 120 through the mobile terminal 150, for example.

According to such a configuration described above, when an operation is performed on the vehicle 102 using one electronic key among the electronic keys 160 and so on, the input information management system 100 acquires key information of the one used among the electronic keys 160 and so on, and stores the key information in the storage device. The key information is a code string or a data string forming respective one of the electronic keys 160 and so on, and indicates validity, attribute or the like of the corresponding one of the electronic keys 160 and so on.

Furthermore, when the key information of the used one among the electronic keys 160 and so on is acquired, the input information management system 100 compares the acquired key information (referred to as "current key information") with the key information that is last stored before acquisition of the current key information (referred to as "last key information"). Then, on the basis of the result of comparison, the input information management system 100 instructs the application execution device 104 to erase the input information including the personal information and the like and stored in the storage device of the application execution device 104.

As described above, in the present embodiment, the key information of each of the electronic keys 160 and so on includes the category information indicating the category of a holder of the corresponding one of the electronic keys 160 and so on. For example, the category information may be specifically expressed using a sign that is defined in advance, such as "1" for the owner of the vehicle 102, "2" for the specific user, and "3" for the non-specific user.

Furthermore, in the present embodiment, the key information of each of the electronic keys 160 and so on may include authentication information for identifying the corresponding one of the electronic keys 160 and so on.

Moreover, in the case where the category information included in the key information (current key information) of the current electronic key that is used and the category information included in the last key information do not match, the input information management system 100 issues an instruction to the application execution device 104 to erase the input information from the storage device of the application execution device 104.

Furthermore, in the case where the category information included in the current key information and the category information in the last key information match, and the matched pieces of category information are predetermined category information, if the authentication information in the current key information and the authentication information in the last key information are different from each other, the input information management system 100 issues an instruction to the application execution device 104 to erase the input information stored in the application execution device 104. The predetermined category information here may indicate that the holder of the electronic key in question is a non-specific user.

As described above, when the vehicle 102 is newly operated using one of the electronic keys 160 and so on, the input information management system 100 configured in the above manner determines whether to erase the input information, such as the personal information, currently stored in the application execution device 104, on the basis of comparison of the category information and the authentication information between the key information of the currently used one of the electronic keys 160 and so on (i.e., the current key information) and the key information of the previously used last electronic key among the electronic keys 160 and so on (i.e., the last key information). That is, the input information management system 100 does not identify each of the holders of the electronic keys 160 and so on used on the vehicle 102, and thus, plagiarism and the like of input information, such as personal information, may be prevented by a simple process without requiring a database associating the key information and each individual holder.

Furthermore, in the case where the current key information and the last key information both include category information indicating a non-specific user, the input information management system 100 erases the input information on the basis of comparison of the authentication information included in the pieces of key information. The input information management system 100 may thus appropriately detect switching between users who are non-specific users and who are third-party users and erase the input information, and also, in the case of switching between specific users who have clear relationships (such as a parent-child relationship) with the owner of the vehicle 102, the input information management system 100 may enable re-use of the input information without erasing the input information, and convenience of the specific users may thus be secured.

Additionally, as described above, the authentication information is used to detect switching between users in a case where the category information indicating a non-specific user is included in the current key information and the last key information, and thus, it is sufficient if the authentication information is included at least in the key information including the category information indicating a non-specific user. However, use of the category information indicating a non-specific user as the predetermined category information described above is only an example and is not restrictive. The category information indicating a specific user may also be used as the predetermined category information described above. In this case, the input information may be erased also at the time of switching between specific users, and re-use of the input information between the specific users may be prevented.

Figure 2:
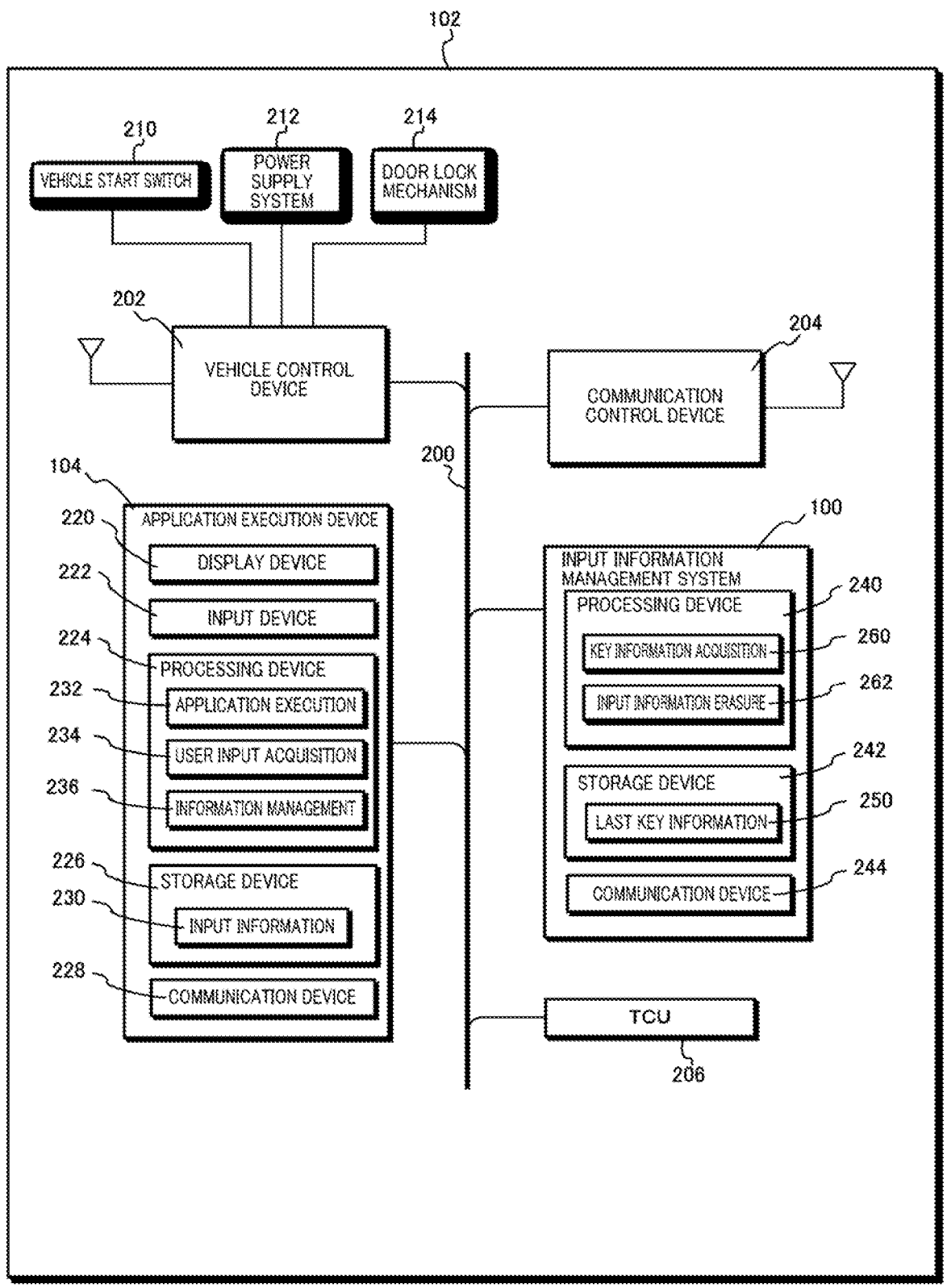
FIG. 2 is a diagram showing a configuration of the input information management system shown in FIG. 1.

FIG. 2 is a diagram showing an example of a configuration of the input information management system 100, together with example configurations of related devices in the vehicle 102. As described above, in the present embodiment, the input information management system 100 is configured as one device, such as an electronic control unit (ECU). The input information management system 100 is installed in the vehicle 102, and is communicably connected, by an in-vehicle network bus 200, to a vehicle control device 202, a communication control device 204, the application execution device 104, and a telematics control unit (TCU) 206. The in-vehicle network bus 200 here is a CAN bus in conformity with Controller Area network (CAN) communication standard, for example.

The vehicle control device 202 has a receiver/transmitter, a CPU (Central Processing Unit) (not illustrated) and a memory (not illustrated) that stores programs and various data, and controls the vehicle 102 by executing, by the CPU, the programs stored in the memory. The vehicle control device 202 communicates with the FOB key 140 held by the user 120, who is the owner of the vehicle 102, and detects presence of the FOB key 140. Specifically, the vehicle control device 202 communicates with the FOB key 140, and acquires the key information of the electronic key 160 of the FOB key 140. Then, the vehicle control device 202 compares at least a part (for example, electronic key basic information described later) of the acquired key information with at least a part of the key information stored in the vehicle control device 202, and when the parts match, the vehicle control device 202 determines that the FOB key 140 is detected.

When the FOB key 140 is detected, or when a valid electronic key notification is received from the communication control device 204 through the in-vehicle network bus 200, the vehicle control device 202 determines that a valid electronic key is present in or around the vehicle 102.

The vehicle control device 202 detects an operation of a vehicle start switch 210 performed by one of the users 120 and so on, under the condition that a valid electronic key among the electronic keys 160 and so on is present in or around the vehicle 102, and controls on/off of a power supply system 212 that supplies power to a drive motor (not shown) and the like of the vehicle 102.

Furthermore, when an instruction for locking/unlocking a door of the vehicle 102 is received from the FOB key 140, or when a door lock/unlock instruction is received from the communication control device 204 through the in-vehicle network bus 200, the vehicle control device 202 issues an instruction to a door lock mechanism 214 to lock/unlock the door.

Furthermore, in the present embodiment, after locking or unlocking the door of the vehicle 102 under the instruction from the FOB key 140, the vehicle control device 202 transmits the key information of the electronic key 160 of the FOB key 140 to the input information management system 100 through the in-vehicle network bus 200. Furthermore, after locking or unlocking the door of the vehicle 102 in response to a door lock/unlock instruction from the communication control device 204, the vehicle control device 202 transmits, to the communication control device 204, a key information transmission instruction instructing transmission, to the input information management system 100, of the key information of the one electronic key that is currently authenticated by the communication control device 204, among the electronic keys 162 and so on.

The communication control device 204 has a receiver/transmitter, a CPU (Central Processing Unit) (not illustrated) and a memory (not illustrated) that stores programs and various data, and controls communication by executing, by the CPU, the programs stored in the memory. The communication control device 204 communicates with the mobile terminals 152 and so on of the users 122 and so on, and acquires the key information of the electronic keys 162 and so on held in the mobile terminals 152 and so on.

Figure 3:
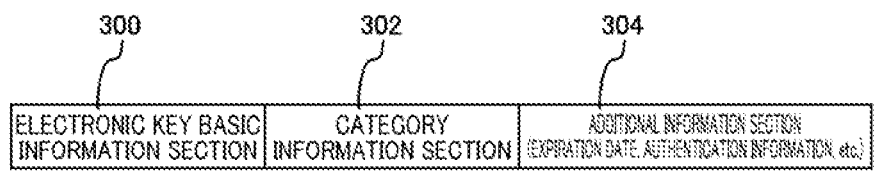
FIG. 3 is a diagram showing an example structure of key information of an electronic key of the input information management system shown in FIG. 1.

FIG. 3 is a diagram showing an example structure of the key information of the electronic key 160 held by the FOB key 140 and/or the electronic keys 162 and so on held by the mobile terminals 152 and so on. For example, the key information includes an electronic key basic information section 300, a category information section 302, and an additional information section 304. The electronic key basic information section 300 stores electronic key basic information. The electronic key basic information is used for authentication of whether the corresponding one of the electronic keys 160 and so on is a valid electronic key or not. The category information section 302 stores the category information described above.

The additional information section 304 stores other pieces of information, such as the authentication information described above, and may also store information such as an expiration date and the like of the corresponding one of the electronic keys 160 and so on. Particularly, in the present embodiment, in the case where at least the category information indicating a non-specific user is stored in the category information section 302, the authentication information described above is stored in the additional information section 304.

For example, the authentication information may be any information that allows one electronic key, among the electronic keys 164, 166 and 168 that are currently valid (for which the expiration date is not reached, for example) and that include the category information indicating a non-specific user, to be distinguished from other electronic keys. Accordingly, for example, the authentication information of one electronic key that is no longer valid may be re-used as the authentication information of the electronic key that is newly issued, under the condition that the category information indicating a non-specific user is included in the key information. This enables a load regarding a generation process or a management process for the authentication information by the key management server 106 to be reduced.

The communication control device 204 compares the electronic key basic information that may be included in the key information of one of the electronic keys 162 and so on received from the corresponding one of the mobile terminals 152 and so on with the electronic key basic information stored in the communication control device 204, and when the pieces of information match, the corresponding one of the electronic keys 162 and so on is authenticated as a valid electronic key. In this case, if an expiration date is included in the additional information held by the key information, the communication control device 204 authenticates the corresponding one of the electronic keys 162 and so on as a valid electronic key, under the condition that the current date/time is before the expiration date.

Furthermore, after authenticating the corresponding one of the electronic keys 162 and so on as a valid electronic key, the communication control device 204 transmits a valid electronic key notification to the vehicle control device 202. The corresponding one of the users 122 and so on is thereby allowed to press the vehicle start switch 210 and activate the vehicle drive motor.

Furthermore, in the case of authenticating one of the electronic keys 162 and so on as a valid electronic key, if a lock/unlock request for a door of the vehicle 102 is received from the corresponding one of the mobile terminals 152 and so on, the communication control device 204 transmits a door lock/unlock instruction to the vehicle control device 202. The corresponding one of the users 122 and so on may thereby unlock or lock the door of the vehicle 102 using his/her mobile terminal among the mobile terminals 152 and so on.

Furthermore, in response to reception of the key information transmission instruction from the vehicle control device 202, the communication control device 204 transmits the key information of the authenticated one of the electronic keys 162 and so on to the input information management system 100.

For example, the application execution device 104 is a display audio device, and executes various application programs automatically or in response to instructions from the users 120 and so on, and provides various functions to the users 120 and so on.

Specifically, for example, the application execution device 104 includes a display device 220 (display), an input device 222, a processing device 224, a storage device 226, and a communication device 228. For example, the display device 220 is a liquid crystal display device, and is disposed in a dashboard of the vehicle 102, for example. For example, the input device 222 is a touch panel disposed on a display screen of the display device 220, which is a liquid crystal display device, and receives input operations of the users 120 and so on related to instructions, data and the like, and outputs information about the input operations to the processing device 224.

For example, the communication device 228 is a CAN transceiver for communicating with other devices, such as the input information management system 100, through the in-vehicle network bus 200, which is a CAN bus, for example.

For example, the storage device 226 is configured by a volatile and/or non-volatile semiconductor memory, a hard disk device and/or the like. Application programs to be executed by the processing device 224 are stored in the storage device 226, and also, data necessary for a process by the processing device 224 is stored in the storage device 226 in advance or as the process progresses. Particularly, in the present embodiment, input information 230 is stored in the storage device 226, the input information 230 including the personal information, the account information or the like input by the users 120 and so on through the input device 222 according to applications executed by the processing device 224.

For example, the processing device 224 is a computer including a processor such as a central processing unit (CPU). The processing device 224 may be configured to include a read only memory (ROM) in which programs are written, a random access memory (RAM) for temporarily storing data, and the like. Moreover, the processing device 224 includes, as functional elements or functional units, an application execution unit 232, a user input acquisition unit 234, and an information management unit 236.

These functional elements provided in the processing device 224 are implemented by the processing device 224 as a computer executing programs, for example. Additionally, the computer programs may be stored in an arbitrary computer-readable storage medium.

The application execution unit 232 is a so-called application that is currently being executed by the processing device 224, and is implemented by the processing device 224 executing a corresponding application program stored in the storage device 226, on an operating system (OS) executed by the processing device 224, for example. The application execution unit 232 provides a function described in the application program to the users 120 and so on. For example, the application execution unit 232 may execute an application such as a web browser, establish a communication to a communication network, such as the Internet, outside the vehicle through the TCU 206, and exchange data with a website on the Internet.

The user input acquisition unit 234 acquires the input information including the personal information, the account information or the like input by the users 120 and so on through the input device 222, according to the process by the application execution unit 232, and stores the input information in the storage device 226. For example, the user input acquisition unit 234 is implemented as a part of the application program described above or a part of the OS. More specifically, the user input acquisition unit 234 may partly configure a cookie in a web browser.

The information management unit 236 manages the input information 230 in the storage device 226. Specifically, the information management unit 236 erases the input information 230 stored in the storage device 226, in response to an input information erasure instruction from the input information management system 100. In addition, the information management unit 236 may generate and hold classification information for classifying the input information 230 stored in the storage device 226 into categories. This category enables secret information, plagiarism of which needs to be prevented, and general information other than the secret information to be distinguished from each other.

Furthermore, the secret information may include the personal information, the identification code (ID code), the account information, the password, the login information, a correct answer for a security answer, and the like of corresponding one of the users 120 and so on. In this case, in response to reception of the input information erasure instruction from the input information management system 100, the information management unit 236 may erase only information that is classified as the secret information, in the input information 230 stored in the storage device 226, for example.

For example, the input information management system 100 includes a processing device 240, a storage device 242, and a communication device 244. For example, the communication device 244 is a CAN transceiver for communicating with other devices, such as the application execution device 104, through the in-vehicle network bus 200, which is a CAN bus, for example.

For example, the storage device 242 is configured by a volatile and/or non-volatile semiconductor memory, a hard disk device and/or the like. Application programs to be executed by the processing device 240 are stored in the storage device 242, and also, data necessary for a process by the processing device 240 is stored in the storage device 242 in advance or as the process progresses. Particularly, in the present embodiment, the key information of one of the electronic keys 160 and so on transmitted from the vehicle control device 202 and/or the communication control device 204 is stored in the storage device 242 by the processing device 240 as last key information 250.

For example, the processing device 240 is a computer including a processor such as a CPU. The processing device 240 may be configured to include a ROM in which programs are written, a RAM for temporarily storing data, and the like. Moreover, the processing device 240 includes, as functional elements or functional units, a key information acquisition unit 260, and an input information erasure unit 262.

These functional elements provided in the processing device 240 are implemented by the processing device 240 as a computer executing programs, for example. Additionally, the computer programs may be stored in an arbitrary computer-readable storage medium.

The key information acquisition unit 260 acquires and stores the key information of the electronic keys 160 and so on. The key information may be received from the vehicle control device 202 or the communication control device 204, when an operation is performed on the vehicle 102, such as when the door of the vehicle 102 is unlocked, using one of the electronic keys 160 and so on.

When the key information is acquired by the key information acquisition unit 260, the input information erasure unit 262 compares the acquired key information (that is, the current key information) with the last key information 250 last stored in the storage device 242 by the key information acquisition unit 260 before acquisition of the current key information. Furthermore, the input information erasure unit 262 determines whether to erase the input information 230 stored in the storage device 226 of the application execution device 104, on the basis of the result of the comparison. Then, on the basis of the result of the determination, the input information erasure unit 262 issues an instruction to the application execution device 104, for example, to erase the input information 230 stored in the storage device 226.

More specifically, the input information erasure unit 262 erases the input information stored in the storage device 226, when the category information in the current key information and the category information in the last key information do not match. This is because, when pieces of the category information do not match between the current key information and the last key information, it is apparent that a previous user and a current user of the vehicle 102 are different, and plagiarism or the like of the input information 230 is possibly caused.

Furthermore, in a case where the category information in the current key information and the category information in the last key information 250 match, and the matched pieces of category information are predetermined category information, such as category information indicating that the holder of the electronic key is a non-specific user, the input information erasure unit 262 erases the input information 230 stored in the storage device 226, if the authentication information in the current key information and the authentication information in the last key information are different from each other.

This is because, when the pieces of category information match between the current key information and the last key information, the matched pieces of category information indicate non-specific users, and pieces of the authentication information are different between the pieces of key information, it can be determined that switching between third-party users who are not related to each other in any way occurred, and it is considered necessary to prevent plagiarism or the like of the input information 230.

Furthermore, in a case where the category information in the current key information and the category information in the last key information 250 match, and the matched pieces of category information indicate specific users, the input information erasure unit 262 does not erase the input information 230 stored in the storage device 226.

This is because, when the pieces of category information match between the current key information and the last key information, and the matched pieces of category information indicate specific users, it is apparent that the previous user and the current user of the vehicle 102 have a specific relationship, such as family members, and it can be assumed that problems such as plagiarism of the input information 230 do not arise even if the input information 230 of the previous user is used by the current user. Furthermore, family members may share the account information and the like, and convenience is considered to be more increased by allowing re-use of the input information 230 without erasing the same.

However, the above case is merely an example, and as described above, the input information 230 may also be erased in a case where the matched pieces of category information indicate specific users, if the authentication information is different between the current key information and the last key information.

After the input information erasure unit 262 determines, by the process described above, whether to erase the input information 230 or not, the key information acquisition unit 260 stores, in the storage device 242, the current key information as the last key information 250.

Next, an operation by the input information management system 100 will be described. FIG. 4 is a flowchart showing an example procedure of an operation by the input information management system 100. The present process is started when power of the input information management system 100 is switched on, and is ended when the power is switched off.

When the process is started, first, the key information acquisition unit 260 of the processing device 240 determines whether current key information is received through the in-vehicle network bus 200 (S100). As described above, the current key information is received from the vehicle control device 202 or the communication control device 204, when an operation is performed on the vehicle 102, such as when the door of the vehicle 102 is unlocked, using one of the electronic keys 160 and so on.

Then, when the current key information is not received (S100: NO), the key information acquisition unit 260 returns to step S100, and waits until the current key information is received. On the other hand, when the current key information is received (S100: YES), the key information acquisition unit 260 acquires the received current key information (S102), and outputs the same to the input information erasure unit 262. When the current key information is received from the key information acquisition unit 260, the input information erasure unit 262 determines whether pieces of category information match between the current key information that is received and the last key information that is stored in the storage device 242 (S104).

Then, in the case of match (S104: YES), the input information erasure unit 262 determines whether the matched pieces of category information indicate non-specific users (S106). Then, in the case where the matched pieces of category information indicate non-specific users (S106: YES), the input information erasure unit 262 determines whether pieces of authentication information match between the current key information and the last key information (S108).

Then, in the case of non-match (S108: NO), the input information erasure unit 262 issues an instruction to the application execution device 104, for example, to erase the input information 230 stored in the storage device 226 (S110).

Subsequently, the key information acquisition unit 260 stores in the storage device 242, as the last key information 250, the current key information acquired in step S102 (S112), and returns to step S100 to repeat the processes.

On the other hand, in the case where the pieces of category information do not match between the current key information and the last key information in step S104 (S104: NO), the input information erasure unit 262 proceeds to step S110, and erases the input information 230 in the storage device 226.

Furthermore, in the case where the categories matched in step S106 do not indicate non-specific users (S106: NO), the input information erasure unit 262 proceeds to step S112 without erasing the input information 230.

Furthermore, also in the case where the pieces of authentication information match between the last key information and the current key information in step S108 (S108: YES), the input information erasure unit 262 proceeds to step S112 without erasing the input information 230.

Note that the present invention is not limited to the configuration of the embodiment described above, and may be implemented in various modes within the scope of the present invention.

For example, in the present embodiment, the input information management system 100 is configured as one in-vehicle device, but such a case is not restrictive. For example, the input information management system 100 may be configured by having the functions thereof allotted to a plurality of devices. For example, the input information management system 100 may be configured by a first device including the function of the key information acquisition unit 260 and a part corresponding to the storage device 242 of the input information management system 100, and a second device including the function of the input information erasure unit 262, the first device and the second device being communicably connected by the in-vehicle network bus 200.

Alternatively, the input information management system 100 may be configured by having the functions thereof allotted to one device that is disposed outside the vehicle 102, and another device that is disposed inside the vehicle 102. In this case, the one device and the other device may function as the input information management system 100 by being communicably connected to each other through the network 108, for example. Moreover, the input information management system 100 may be implemented by being embedded in the application execution device 104 that acquires the input information from the users 120 and so on.

Furthermore, in the present embodiment, the category information included in the key information indicates one of categories including the owner of the vehicle 102, the specific user and the non-specific user, but such a case is not restrictive. It is sufficient if the category indicated by the category information enables a distinction between a user group for which erasure of the input information 230 is necessary at the time of switching between the users 120 and so on who use the vehicle 102, and a user group for which such erasure is not necessary.

For example, the category information may enable a distinction between a user for whom functions are limited and execution of an application, such as a web browser, that requires input of secret information, such as the personal information and the account information, is not allowed, and a user for whom functions are not limited and execution of such an application is allowed. In this case, for example, in the description above, the category of a user for whom functions are not limited may be used instead of the categories of the vehicle owner and the specific user, and the category of a user for whom functions are limited may be used instead of the category of the non-specific user.

Alternatively, the category of the non-specific user may be subdivided into a non-specific user for whom functions are not limited and a non-specific user for whom functions are limited. In this case, for example, the application execution device 104 may acquire the current key information from the communication control device 204, and if the category information in the acquired key information indicates a non-specific user for whom functions are limited, the application execution device 104 may refrain from executing an application that uses the secret information, such as the account information, at the time of execution of an application, or may refrain from executing some functions of the application. Furthermore, when the pieces of category information in the current key information and the last key information both indicate a non-specific user for whom functions are not limited, the input information erasure unit 262 may erase the input information 230 stored in the storage device 226, if the pieces of authentication information in the pieces of key information are different from each other.

Furthermore, in the embodiment described, the input information management system 100 acquires the current key information when the door of the vehicle 102 is unlocked, but such a case is not restrictive. Instead or in addition, the input information management system 100 may acquire the current key information, when the vehicle start switch 210 is pressed and the vehicle 102 is started, for example.

For example, if the input information management system 100 is to acquire the current key information at the time of unlocking of the door of the vehicle 102 and at the time of pressing of the vehicle start switch 210, whether the input information 230 should be erased or not may be appropriately determined by also detecting switching between the users 120 and so on performed between the unlocking of the door and start of the vehicle. For example, such switching between the users 120 and so on may occur in a case where switching to the next user is performed without the previous user locking the door of the vehicle 102.

Furthermore, in the embodiment described above, at the time of determining whether to erase the input information 230 or not, the input information erasure unit 262 does not use information about the expiration date included in the key information, but such a case is not restrictive. In the case where the last key information includes the additional information indicating the expiration date of the corresponding one of the electronic keys 160 and so on, the input information erasure unit 262 may, in addition to performing the operation described above, erase the input information 230 in the storage device 226, when the expiration date is reached, even before the next user uses one of the electronic keys 160 and so on, for example.

Furthermore, in the embodiment described above, the input information management system 100 is to erase the input information 230 that is input to the application execution device 104, which is an in-vehicle device, and that is stored in the storage device 226 of the application execution device 104, but such a case is not restrictive. The input information management system 100 may operate to erase input information by taking, as a target, input information that is input and stored in any in-vehicle device which may be installed in the vehicle 102 and to which information to be kept secret, such as the personal information and the account information of the users 120 and so on, may be input.

Furthermore, input information that is input in an in-vehicle device as described above by the users 120 and so on may be stored in a storage device of the in-vehicle device, in the same manner as with the storage device 226 of the application execution device 104, for example, but such a case is not restrictive. The input information may be stored in a storage device of another device that is installed in the vehicle 102, or a storage device of a device that is present outside the vehicle 102 and that is communicably connected to the in-vehicle device. In this case, the input information management system 100 may erase the input information stored in the storage device of the other device or the device present outside the vehicle, by issuing an instruction to the in-vehicle device or, in a case where the other device or the device present outside the vehicle is communicably connected, by issuing an instruction to the other device or the device present outside the vehicle.

As described above, the input information management system 100 of the present embodiment manages the input information that is input, by the users 120 and so on, to the vehicle 102 that can be used by the plurality of electronic keys 160 and so on. The input information management system 100 includes the key information acquisition unit 260, and the input information erasure unit 262. When an operation is performed on the vehicle 102 using one of the electronic keys 160 and so on, the key information acquisition unit 260 acquires and stores the key information of the corresponding one of the electronic keys 160 and so on. The input information erasure unit 262 erases the input information 230 that is stored in the storage device 226. Here, when the key information is acquired by the key information acquisition unit 260, the input information erasure unit 262 compares the current key information that is acquired with the last key information 250 that is last stored by the key information acquisition unit 260 before acquisition of the current key information, and erases the input information 230 stored in the storage device 226 on the basis of the result of the comparison.

According to such a configuration, switching between the users of the vehicle 102 may be appropriately detected and the input information 230 may be appropriately erased, on the basis of the last key information 250 last used on the vehicle 102 and the current key information that is currently being used. Accordingly, the input information management system 100 may prevent plagiarism and the like of the account information, the personal information and the like through the application execution device 104 and the like installed in a vehicle, which may possibly occur between users.

Furthermore, with the input information management system 100, pieces of the key information of the electronic keys 160 and so on that are acquired by the key information acquisition unit 260 include category information indicating categories of the holders of the respective electronic keys 160 and so on. Furthermore, in the case where the category information in the current key information and the category information in the last key information do not match, the input information erasure unit 262 erases the input information 230 that is stored in the storage device 226.

According to such a configuration, a change of the user of the vehicle 102 may be easily determined on the basis of a change of the category information in the key information being used, and the input information 230 may be appropriately erased.

Furthermore, with the input information management system 100, the category information is for distinguishing between at least a vehicle owner, a specific user who has a predetermined relationship with the vehicle owner, and a non-specific user who is neither the vehicle owner nor the specific user.

According to such a configuration, the users 120 and so on of the vehicle 102 may be grouped by category, and a user group for which the input information 230 has to be erased at the time of switching between the users, and a user group for which such erasure is not necessary may be distinguished from each other. As a result, whether switching between the users requires erasure of the input information 230 or not may be easily determined.

Furthermore, with the input information management system 100, the key information of each of the electronic keys 160 and so on that is acquired by the key information acquisition unit 260 includes, in the additional information, for example, the authentication information for identifying the corresponding one of electronic keys 160 and so on. Furthermore, in a case where the category information in the current key information and the category information in the last key information 250 match, and the matched pieces of category information indicate a predetermined category, the input information erasure unit 262 erases the input information 230 stored in the storage device 226, if the authentication information in the current key information and the authentication information in the last key information 250 are different from each other.

According to such a configuration, whether the current and last users are users who are classified into a specific category requiring erasure of the input information 230 at the time of switching between users or not may be appropriately determined, and switching between the users may be easily detected on the basis of the authentication information.

Furthermore, the predetermined category information indicates that the holder of the corresponding one of the electronic keys 160 and so on is a non-specific user. According to such a configuration, for example, by categorizing a third party who borrows the vehicle 102 from the owner as a non-specific user, plagiarism and the like of the input information 230 between the third-party users may be effectively prevented.

Furthermore, with the input information management system 100, a plurality of electronic keys 164, 166 and 168, each including key information at least including the category information indicating a non-specific user, include respective pieces of the authentication information in the respective pieces of key information, the pieces of authentication information being different from each other. According to such a configuration, when a plurality of third-party users who are categorized as non-specific users switch between themselves to use the vehicle 102, such a situation may be appropriately recognized, for example.

Furthermore, with the input information management system 100, the input information 230 includes at least one of the personal information, the identification code, the account information, the password, the login information, or a correct answer for a security question of the corresponding one of the users 120 and so on who input the input information 230.

According to such a configuration, occurrence of plagiarism and the like between users may be prevented, with respect to pieces of information that are input by the users 120 and so on and that need to be kept secret.

Furthermore, with the input information management system 100, the storage device 226 is provided in the application execution device 104 for executing application programs. Furthermore, the input information 230 is information that is input by the users 120 and so on to the application execution device 104 at the time of execution of application programs. Moreover, the input information erasure unit 262 issues an instruction to the application execution device 104 to erase the input information 230 stored in the storage device 226.

According to such a configuration, the input information 230 may be appropriately erased at the time of switching between the users of the vehicle 102, with respect to the input information 230, such as the personal information, that is input by one of the users 120 and so on to the application execution device 104, such as a display audio device, capable of executing an arbitrary application.

REFERENCE SIGNS LIST 100 input information management system
102 vehicle
104 application execution device
106 key management server
108 network
120, 122, 124, 126, 128 user
140 FOB key
150, 152, 154, 156, 158 mobile terminal
160, 162, 164, 166, 168 electronic key
200 in-vehicle network bus
202 vehicle control device
204 communication control device
206 telematics control unit (TCU)
210 vehicle start switch
212 power supply system
214 door lock mechanism
220 display device
222 input device
224, 240 processing device
226, 242 storage device
228, 244 communication device
230 input information
232 application execution unit
234 user input acquisition unit
236 information management unit
250 last key information
260 key information acquisition unit
262 input information erasure unit
300 electronic key basic information section
302 category information section
304 additional information section

What is claimed is:

1. An input information management system for a vehicle that can be used by using each of a plurality of electronic keys, the system managing input information that is input by a user, the system comprising a first processor and a memory, wherein the first processor:
   acquires and stores key information of an electronic key, when an operation is performed on the vehicle using the electronic key; and
   erases the input information that is stored in the memory, wherein
   the key information of the electronic key that is acquired includes category information indicating a category of a holder of the electronic key,
   when the key information is acquired by, the first processor compares current key information that is acquired with last key information that is last stored before acquisition of the current key information, and when the category information in the current key information and the category information in the last key information do not match, the first processor erases the input information that is stored in the memory without identifying an individual holder of the electronic key.

2. The input information management system according to claim 1, wherein the category information is for distinguishing between at least an owner of the vehicle, a specific user who has a predetermined relationship with the owner, and a non-specific user who is neither the owner nor the specific user.

3. The input information management system according to claim 2, wherein
   the key information of the electronic key that is acquired includes authentication information for identifying the electronic key, and
   in a case where the category information in the current key information and the category information in the last key information match, and matched pieces of the category information are predetermined category information, the first processor erases the input information that is stored in the memory, if the authentication information in the current key information and the authentication information in the last key information are different from each other.

4. The input information management system according to claim 3, wherein the predetermined category information indicates that the holder of the electronic key is the non-specific user.

5. The input information management system according to claim 3, wherein a plurality of the electronic keys, each including the key information at least including the category information indicating the non-specific user, include respective pieces of authentication information in respective pieces of the key information, the pieces of authentication information being different from each other.

6. The input information management system according to claim 1, wherein the input information includes at least one of personal information, an identification code, account information, a password, login information, or a correct answer for a security question of the user.

7. The input information management system according to claim 1, wherein
   the memory is provided in an application execution device having a second processor for executing an application program, the input information is information that is input by the user to the application execution device at a time of execution of the application program by the second processor, and
   the first processor issues an instruction to the second processor of the application execution device to erase the input information that is stored in the memory.

* * * * *